(12) United States Patent
Shreibati et al.

(10) Patent No.: US 11,436,566 B2
(45) Date of Patent: Sep. 6, 2022

(54) TECHNIQUES FOR PRESENTING A CONTEXTUAL CONTACT LIST

(71) Applicant: Microsoft Technology Licensing, LLC, Redmond, WA (US)

(72) Inventors: Sammy Shreibati, Los Altos, CA (US); Vivian Mak Urata, San Francisco, CA (US); Mark Hull, San Jose, CA (US); Haiyang Liu, Redwood City, CA (US); Birjodh Tiwana, Lafayette, CA (US); Siva Visakan Sooriyan, San Francisco, CA (US); Jesse Jyh-Cherng Hsia, Santa Clara, CA (US); Michael Joshua Aft, Redwood City, CA (US); Kinjal Basu, Stanford, CA (US); Shaunak Chatterjee, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 63 days.

(21) Appl. No.: 15/663,492

(22) Filed: Jul. 28, 2017

(65) Prior Publication Data
US 2018/0032961 A1    Feb. 1, 2018

Related U.S. Application Data

(60) Provisional application No. 62/368,700, filed on Jul. 29, 2016.

(51) Int. Cl.
*G06Q 10/10* (2012.01)
*G06Q 50/00* (2012.01)
(52) U.S. Cl.
CPC ......... *G06Q 10/1053* (2013.01); *G06Q 50/01* (2013.01)

(58) Field of Classification Search
CPC .. G06Q 50/01; G06Q 10/1053; G06Q 10/105; G06Q 10/063112
(Continued)

(56) References Cited

U.S. PATENT DOCUMENTS 8,526,969 B2 * 9/2013 Zheng ..................... H04L 67/54
455/457
8,713,000 B1 * 4/2014 Elman .................... G06Q 30/08
707/722

(Continued)

OTHER PUBLICATIONS

Liu, "Voting analytic process for selecting supplier" (Year: 2004).*

*Primary Examiner* — Sangeeta Bahl
(74) *Attorney, Agent, or Firm* — Schwegman Lundberg & Woessner, P.A.

(57) ABSTRACT

Described herein is a contextual contact recommendation or suggestion service and system. The service, which, in some embodiments, is integrated with a social networking service and/or an instant messaging service, takes as input a first parameter that identifies a member of the social networking service, and a second parameter that defines a context (e.g., a web page that is being viewed by the member. The service, based in part on the context, computes a ranked list of members to populate a contextual contact list, thereby recommending or suggesting contacts, with whom the member might be interested in initiating, or continuing, a conversation, based on the context of the member's current web browsing session. Optionally, the service may take as input a third parameter, defining a use case, such that the recommendation algorithm can be customized by use case.

20 Claims, 11 Drawing Sheets

(58) Field of Classification Search
USPC .......................................... 705/319, 320, 321
See application file for complete search history.

(56) References Cited

U.S. PATENT DOCUMENTS

| | | | | |
|---|---|---|---|---|
| 9,554,250 | B2* | 1/2017 | De Vries | H04W 8/14 |
| 9,652,810 | B2* | 5/2017 | Richter | G06Q 10/107 |
| 9,756,006 | B2* | 9/2017 | Shapero | H04L 51/226 |
| 2011/0092227 | A1* | 4/2011 | Phukan | H04M 1/274516 |
| | | | | 455/456.3 |
| 2011/0161329 | A1* | 6/2011 | Winkler | G06F 16/951 |
| | | | | 707/748 |
| 2011/0231396 | A1* | 9/2011 | Dhara | H04M 3/565 |
| | | | | 707/751 |
| 2012/0095931 | A1* | 4/2012 | Gurion | G06Q 10/00 |
| | | | | 705/319 |
| 2012/0296984 | A1* | 11/2012 | Khan | H04L 51/04 |
| | | | | 709/206 |
| 2014/0180945 | A1* | 6/2014 | Hoque | G06Q 10/1053 |
| | | | | 705/321 |
| 2014/0244531 | A1* | 8/2014 | Baldwin | G06Q 10/1053 |
| | | | | 705/319 |
| 2014/0279622 | A1* | 9/2014 | Lamoureux | G06Q 10/1053 |
| | | | | 705/319 |
| 2014/0297550 | A1* | 10/2014 | Miller | G06Q 10/1053 |
| | | | | 705/321 |
| 2015/0019483 | A1* | 1/2015 | Tseng | G06Q 30/02 |
| | | | | 707/610 |
| 2015/0046353 | A1* | 2/2015 | Elman | G06Q 50/01 |
| | | | | 705/319 |
| 2015/0046539 | A1* | 2/2015 | Shah | G06N 7/005 |
| | | | | 709/204 |
| 2015/0127565 | A1* | 5/2015 | Chevalier | G06Q 10/00 |
| | | | | 705/319 |
| 2016/0063442 | A1* | 3/2016 | Bennett | G06Q 10/1053 |
| | | | | 705/319 |
| 2016/0217426 | A1* | 7/2016 | Baird | G06Q 10/1053 |

\* cited by examiner

FIGURE 2

Http://www.socialnet.com/company/ACME

SEARCH 🔍

ACME Supplies
Automotive – Detroit, MI – 1,597,214 followers
Ranked 3rd on the 2017 Top Companies List

[SEE JOBS] [USE APP]

🌐🌐🌐 +5
8 Connections work here

ABOUT US

ACME Supplies was founded in 2018 deve... NEW MESSAGE — ☐ X
the automotive industry. ACME deve...
supplies widgets that enable automa... To: ( John Doe x )
driving vehicle operations. Built on t...
of self-driving automobiles, the team a...

Jobs        20

RECENT UPDATES

CEO and
presentati
and prese
ACME's re

Write a new message or attach a file.
📎                                Send

MESSAGING  ✏️ ⚙️         12

Connections to ACME

🌐 John Doe
   Director of Product Management
   *Works at ACME*

🌐 Susan Smith
   Engineer
   *Works at ACME*

🌐 Fred Stone
   Patent Attorney
   *Formerly Worked at ACME*

Recent

🌐 Andy Johnson
   Founder & CEO – Rocket Corp.

🌐 Ruth Bader
   Janitor – Stealth Startup

FIGURE 3

SCORING CANDIDATE CONTACTS WHO ARE, OR WERE, EMPLOYED AT A COMPANY

SCORING CANDIDATE CONTACTS WHO ARE CONNECTED TO OTHER MEMBERS WHO ARE, OR WERE, EMPLOYED AT A COMPANY

½ (EDGE SCORE) + ½ (AVERAGE OF ALL EDGE SCORES)

TECHNIQUES FOR PRESENTING A CONTEXTUAL CONTACT LIST

RELATED APPLICATIONS

This application claims the benefit of U.S. Provisional Application No. 62/368,700, filed Jul. 29, 2016, and titled, "Contextual Contact Suggestions," which is incorporated herein by reference in its entirety.

TECHNICAL FIELD

The subject matter disclosed herein generally relates to data processing systems and computer-based interfaces for instant messaging applications and/or services, and more specifically, to computer program products, methods and systems that facilitate the presentation of a contact list in a dynamic and algorithmically-driven manner, based on a context and/or use case.

BACKGROUND

Instant messaging is a type of online chat that offers real-time text transmission, between client applications, over the Internet or similar computer-based networks. With more advanced instant messaging applications, file transfers, hyperlinks, voice over IP, video, and other non-text-based communications are possible. Instant messaging applications and systems tend to facilitate connections between specified known users, often using what is commonly referred to as a "contact list," also known as a "buddy list" or "friend list".

Many instant messaging applications are implemented as stand-alone applications. As such, when an end-user is performing some activity—for example, researching a company or exploring a job posting and potential job change—the interface of the instant messaging application is not available, and therefore the end-user may not think to initiate a conversation (e.g., chat session) as part of the activity, and in furtherance of the user's objective or goal. Furthermore, even if the end-user does consider initiating a conversation via an instant messaging application, the end-user may have a difficult time identifying the appropriate contact with whom to converse.

Several social networking services offer their members an instant messaging service. In the context of social networking services, each member's contact list is typically populated with those members who are direct connections or friends, as formally defined and memorialized by member interactions via the social networking service. For many members, this results in a contact list that includes hundreds, if not thousands, of individual contacts. In many instances, this can make it extremely difficult to identify and find the appropriate contact (e.g., a name) within the long list of contacts. This makes it difficult and cumbersome to initiate a real-time, instant messaging conversation. Accordingly, some instant messaging services provide the end-user with the ability to self-organize his or her contacts, as presented in the contact list, into categories or groups (e.g., "work" and "personal" contacts). Other instant messaging applications and services automatically categorize contacts based on "status" (often referred to as "presence")—for example, whether an end-user is currently logged into and actively using the instant messaging service, in a meeting, on a phone call, and so on.

BRIEF DESCRIPTION OF THE DRAWINGS

Embodiments of the present invention are illustrated by way of example and not limitation in the figures of the accompanying drawings, in which:

FIGS. 1, 2 and 3 are examples of user interfaces for a messaging service having an overlay-interface and including a contact list with contacts that are ordered in part, based on context derived from an underlying interface (e.g., web page), consistent with some embodiments of the present invention;

DETAILED DESCRIPTION

Figure 1:

Described herein are methods, systems and computer program products to facilitate the presentation of a contextual contact list in a computer-based interface, based on a context and/or use case. In the following description, for purposes of explanation, numerous specific details are set forth in order to provide a thorough understanding of the various aspects of different embodiments of the present invention. It will be evident, however, to one skilled in the art, that the present invention may be practiced without all of these specific details.

Consistent with some embodiments of the present invention, an instant messaging service (hereinafter, "messaging service") is provided as an integrated component of a social networking service. The user interface of the messaging service is advantageously implemented and presented as an overlay-interface, such that the individual interface components of the messaging service are selectively presented on top of a primary interface of the social networking service (e.g., a web page), and can be opened, added or maximized (e.g., made visible), or closed, hidden, or minimized, at the discretion of the end-user. For example, the messaging interface functions similar to what is commonly referred to in the art of computing as a "window". However, as described herein, the window may be controlled through a web browsing application rather than the operating system of the computing device. The window may further have individual user interface control elements that allow the end-user to open and close, or maximize and minimize, the visual display of the messaging interface at his or her desire. Accordingly, when an end-user navigates to a web page that is part of the social networking service, a messaging interface may be presented in a minimized state. By selecting one of a variety of user interface control elements, the end-user can easily maximize the interface and interact with its contents.

In particular, one interface component of the messaging service is a contact list that is automatically populated with contacts that are selected, at least in some embodiments, based on a context. For purposes of the present disclosure, a "context" includes, but is not limited to, any information and data obtained from or otherwise associated with a web page or other underlying interface being presented to the end-user in conjunction with a contact list. As an example, and consistent with some embodiments, a context may be based on a company profile page, a member profile page, a job posting page, or a web page hosting a feed (e.g., news feed) that is being viewed by the end-user. As known to one of ordinary skill in the art, a feed is a construct displayable on a web page, or similar interface, that provides textual and/or audio-visual updates that the user has chosen to receive, either implicitly or explicitly. Accordingly, depending upon the particular type of web page and the content on the web page being viewed by the end-user, the various contacts presented in a contact list may be personalized for the viewing end-user, such that, for different web pages, different contacts are presented and potentially in a different order. Similarly, a "use case," for purposes of the present disclosure, may be determined based on historical data pertaining to prior actions or interactions undertaken by the end-user via the social networking service from which inferences about the end-user's desires or intentions might be drawn. As an example, if a member of the social networking service has performed a variety of searches for job postings, this information may be used to infer that the end-user is an active job seeker, which may ultimately inform the manner in which a contact list is populated with contacts, for a given context (e.g., web page). For instance, when an active job seeker navigates to a company profile page or a job posting page, a contact list may be populated with contacts that include a job recruiter employed by the company associated with the company profile page.

Accordingly, when a member of the social networking service is viewing various web pages, a personalized contact list is presented with each web page. The messaging service or a component thereof, algorithmically determines both the selection of contacts, and their order in the contact list, based on data-driven algorithms. By way of example, when an end-user, using a web-browser application, navigates to a job posting that is hosted by the social networking service, the job posting web page will be presented to the end-user. As the job posting web page is served to the client computing device and presented to the end-user, a contextual contact recommendation module, as a component of the social networking service and/or integrated messaging service, will simultaneously populate a contact list with various contacts of the end-user. As the end-user may have hundreds, or even thousands, of contacts, the contextual contact recommendation module will intelligently (e.g., algorithmically) select and order the contacts based on the context (e.g., content of the web page) that is being viewed. For instance, in the case of a job posting, the contact list may be populated with contacts who, based on their social networking member profiles, are currently or were previously employed with the company on whose behalf the job posting is presented. Similarly, in the case of a member who is viewing the member profile of a second-degree connection (e.g., a friend of a friend), the member may be presented with a contact list that includes contacts that are ordered based on some measure of the strength of connection that each contact has with the second-degree connection. Finally, in the instance of a company profile page, a member viewing the company profile page may be presented with a contact list having contacts ordered based in part on whether or not a contact is, or was previously, employed with the company associated with the company profile page.

Figure 2:
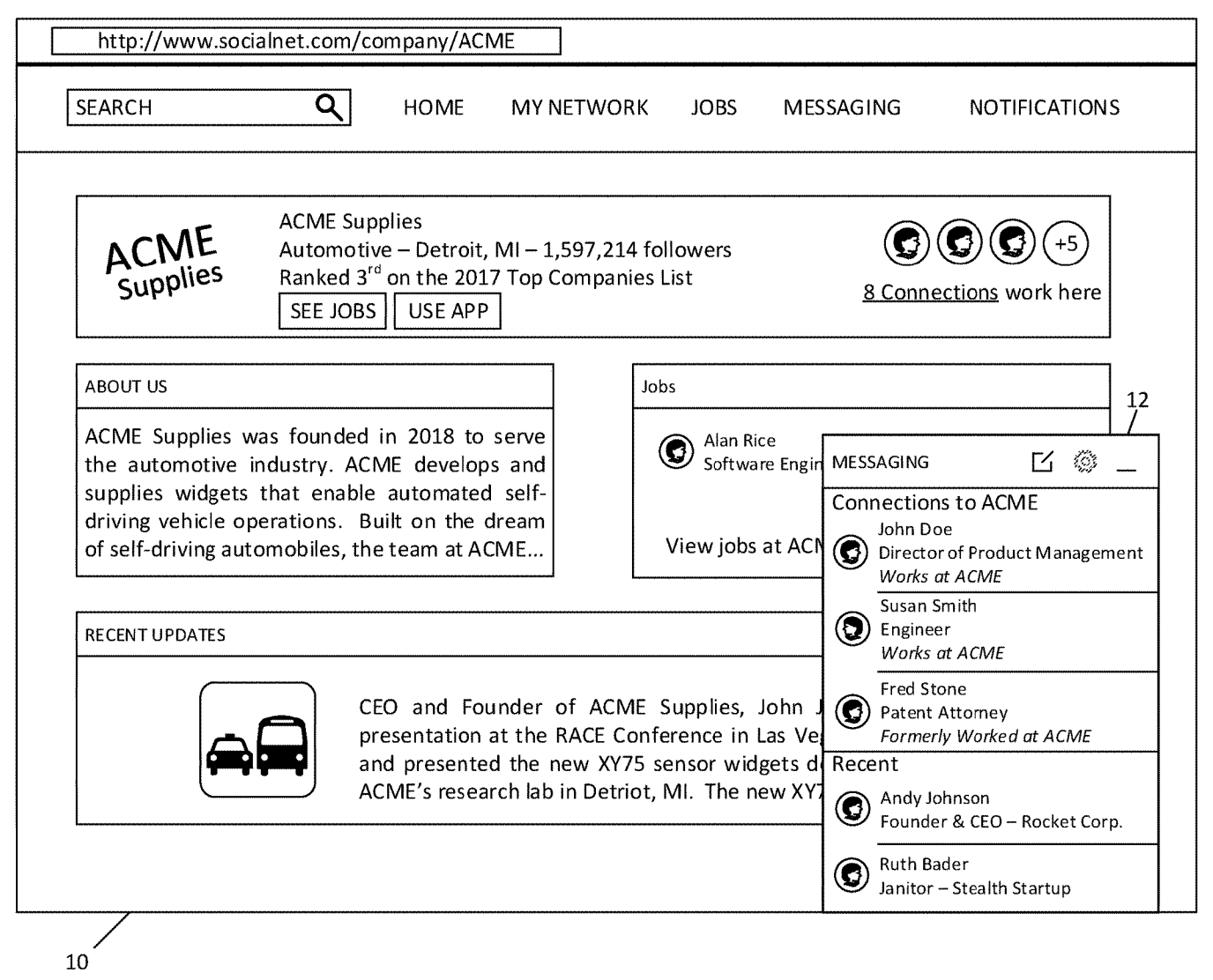

By way of example, FIGS. 1, 2 and 3 illustrate user interfaces for a messaging service having an overlay-interface and including a contact list with contacts that are ordered in part, based on context derived from an underlying interface, consistent with some embodiments of the present invention. As illustrated in FIG. 1, a member of a social networking service ("Alan Rice") has requested a web page 10—specifically, a company page or company profile page for the company, ACME Supplies. The example interface 10 shown in FIG. 1 represents what is commonly referred to as a "company profile" or "company page" for ACME Supplies. As shown, a messaging interface 12 is presented in a minimized state in the lower right portion of the example web page 10. In this example, the viewing end-user ("Alan Rice") has eight connections who, based on their social networking member profiles, are employed with the company, ACME Supplies. The messaging interface 12 includes various user interface control elements (e.g., identified as reference numbers 14, 16 and 18), that provide the end-user with the ability to control the behavior of the messaging interface—specifically, maximizing or opening the messaging interface via a first control element 14, accessing a menu of configuration settings for the messaging service via a second control element 16, and initiating a new conversation in a new chat interface via a third control element 18.

In FIG. 2, the messaging interface 12 has been maximized or opened to reveal a contact list with contacts that have been selected and ordered based at least in part on the underlying web page—that is, the company profile page for the company, ACME Supplies. As shown in the example messaging interface 12, the contact list includes three contacts ("John Doe," "Susan Smith" and "Fred Stone") who work, or previously worked, at ACME Supplies. By simply selecting the top name ("John Doe") in the contact list 12, the end-user can open a new chat interface and initiate a conversation with his contact, "John Doe." An example of this is illustrated in FIG. 3, which shows a messaging interface 20 via which the end-user can communicate a message to "John Doe". As shown in FIG. 3, the messaging interface 20 has the message recipient pre-populated based on the end-user's selection from the contact list.

Note, while the example presented in connection with FIGS. 1, 2 and 3 is described in the context of a web page, the underlying or primary interface may also be implemented as part of a native mobile application, for example, as executing on any of a wide variety of mobile computing devices, including mobile phones and tablet devices that operate with the Android or iOS operating systems, among others. Additional details about various embodiments of the present invention are described below in connection with the descriptions of FIGS. 4 though 11.

Figure 4:
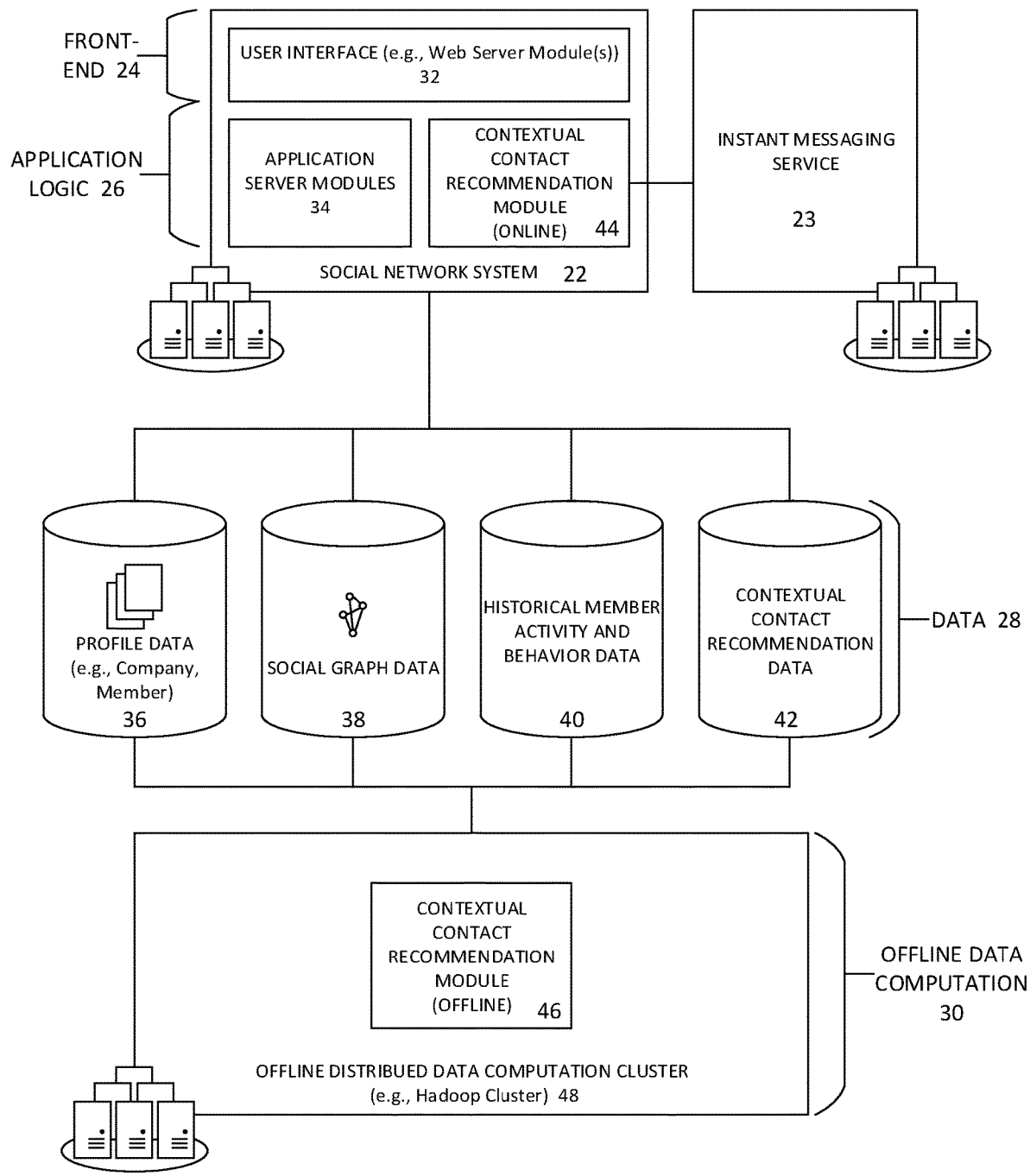
FIG. 4 is a block diagram illustrating various functional components of a social networking service or system, with an integrated instant messaging service, consistent with some embodiments of the present invention.

FIG. 4 is a block diagram illustrating various components or functional modules of a social networking service or system 22, operating in conjunction with an integrated instant messaging service 23, consistent with some embodiments. As shown in FIG. 4, the overall architecture consists of four layers, a front-end layer 24, an application logic layer 26, a data layer 28, and an offline, distributed data computation layer 30. The front-end layer 24 consists of a user interface module (e.g., a web server) 32, which receives requests from various client-computing devices, and communicates appropriate responses to the requesting client devices. For example, the user interface module(s) 32 may receive requests in the form of Hypertext Transport Protocol (HTTP) requests, or other web-based, application programming interface (API) requests.

The application logic layer 26 includes various application server modules 34, which, in conjunction with the user interface module(s) 32, generate various user interfaces (e.g., web pages) with data retrieved from various services and data sources in the data layer 28. With some embodiments, individual application server modules 34 are used to implement the functionality associated with various services and features of the social networking service. For instance, a job recommendation service may be implemented with an application server module, while a photo sharing application may be implemented with a separate application server module, and so on. Accordingly, a variety of other applications or services that are made available to members of the social networking service will be embodied in their own application server modules.

The data layer 28 consists of several databases storing several different types of data, generally. For example, with some embodiments, the data layer 28 includes databases for storing profile data 36 (including member profile and company profile data), social graph data 38, member activity and behavior (e.g., tracking) data 40, and contextual contact recommendation data 42.

Consistent with some embodiments, when a person initially registers to become a member of the social networking service, the person will be prompted to provide some personal information, such as his or her name, age (e.g., birthdate), interests, contact information (e.g., email address, telephone number), hometown, address, educational background (e.g., schools, majors, matriculation and/or graduation dates, etc.), employment history, skills, professional organizations, and so on. This information is collectively referred to as "member profile data" and is stored, for example, in the database with reference number 36. Similarly, when a representative of an organization initially registers the organization with the social network service, the representative may be prompted to provide certain information about the organization. This information may be stored, for example, in the database with reference number 36, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 4 with reference number 38.

The social networking system 22 may provide a broad range of other applications and services that allow members the opportunity to share and receive information, often customized to the interests of the member. For example, with some embodiments, the social networking service may include a photo sharing application that allows members to upload and share photos with other members. With some embodiments, members may be able to self-organize into groups, or interest groups, organized around a subject matter or topic of interest. With some embodiments, the social networking service may host various job postings providing details of job openings with various organizations. With some embodiments, a feed or news feed may be provided. Generally, a member's feed is populated with content postings that are authored, published or submitted by other members or organizations with whom the member is connected or following, via the social networking service. A member may interact with various content postings in the feed, for example, by viewing or reading the content postings, "liking" or up-voting the content postings, commenting on the content postings, and/or re-sharing the content postings. Such member interactions are sometimes referred to as social gestures.

As members interact with the various applications, services and content made available via the social networking service, the members' behavior (e.g., content viewed, searches performed, links or member-interest buttons selected, etc.) may be monitored and information concerning the member's activities and behavior may be stored, for example, as indicated in FIG. 4 by the database with reference number 40. In some instances, this data may be used to algorithmically infer an interest or desire of a member, such that the inference can be used as a "use case" in personalizing or customizing the contacts that are presented in a contacts list for a given context.

Although not shown, with some embodiments, the social networking system 22 provides an application programming interface (API) module via which third-party applications can access various services and data provided by the social networking service. For example, using an API, a third-party application may provide a user interface and logic that enables an authorized representative of an organization to publish messages from a third-party application to a content hosting platform of the social networking service that facilitates presentation of activity or content in a feed or stream maintained and presented by the social networking service. Such third-party applications may be browser-based applications, or may be operating system-specific. In particular, some third-party applications may reside and execute on one or more mobile devices (e.g., phone, or tablet computing devices) having a mobile operating system.

Consistent with some embodiments, the social networking service provides a contextual contact recommendation service that receives various parameters as input, and provides, as output, a ranked list of members for populating a contact list. The contact list is personalized for a member based on a context—that is, based on information relating to the particular web page or interface that is being presented to the member. The input parameters for the contextual contact recommendation service include a member identifier, identifying the particular member who is viewing the web page or interface, as well as a context identifier. The context identifier is generally associated with the particular web page that the member has requested and that is being presented to the member, and in some embodiments may be a uniform resource locator (URL), uniform resource identifier (URI), uniform resource name (URN), or any similar identifier (e.g., company identifier, member identifier, skill identifier, and so forth), or uniform resource characteristic (URC). Based on the combination of the member identifier and the context identifier, the contextual contact recommendation service can identify and rank a set of contacts for presentation in a contextual contact list.

Upon receiving a request for a ranked or ordered set of contacts with which to populate a contextual contact list for a particular member, for a particular context, the contextual contact recommendation service first identifies a set of candidate contacts for the member identified by the member identifier (input parameter). For instance, with some embodiments, candidate contacts may be limited to the member's first-degree, or, first- and second-degree connections. Of course, in other embodiments, there may be no such limitations, such that any member may qualify as a candidate contact. In yet other embodiments, some coarse scoring method may be used to identify the candidate contacts. Once the candidate contacts are identified or obtained, each candidate contact is scored using a formula, model or algorithm that is based on the context identifier. That is, depending upon the context identifier, one of several scoring models is selected for use in scoring the candidate contacts. For example, with some embodiments, the score for each candidate contact may be a weighted combination of attributes or features and the selection of the attributes or features, as well as the weights of the weighting factors may be dependent upon the context identifier. As such, if the context is a company page, those attributes or features related to a member's relationship with the particular company associated with the company page will receive a greater weight, giving those candidate contacts who have an association or affiliation with the company a greater likelihood in being included in the contextual contact list.

If, for example, the web page that is being presented to a member is a company profile page for the company, ACME Supplies, the context identifier may identify ACME Supplies as the relevant company. In scoring the candidate contacts for the member, those candidate contacts (i.e., other members) who are associated with ACME Supplies may receive a higher overall score, because the scoring formula or model associated with the particular context identifier for ACME Supplies gives considerable weight to those candidate contacts, whose member profiles indicate an association or affiliation with ACME Supplies. For instance, for purposes of this example, having an association with ACME Supplies could mean one of a variety of things—for example, a member's profile may indicate that the member is currently employed with AMCE Supplies, was previously employed with ACME Supplies, has a plurality of connections with other member who are (or, were) employed with ACME Supplies, and/or, is connected to one or more members having a specific job title or position (e.g., Founder, CEO, Board Member) with ACME Supplies.

With some embodiments, the contextual contact recommendation service may operate in real-time, such that, the contacts for a contact list are ranked in real-time, responsive to a member requesting a particular web page or interface. However, in other embodiments, such as that illustrated in FIG. 4, the contacts for a particular member and context are pre-computed offline, and then simply retrieved from a database in real-time when needed. For instance, turning again to FIG. 4, the contextual contact recommendation service includes both an online or real-time component—that is, contextual contact recommendation module (online) 44—and, an offline component—that is, contextual contact recommendation module (offline) 46.

In this example, for each member, and for a given context, a ranked set of recommended contacts is generated offline, via the contextual contact recommendation module 46. The offline recommendation module 46 executes as part of the offline distributed data computation cluster 48, which is a framework for distributed storage and processing of large datasets. Consistent with some embodiment, the offline distributed data computation cluster may utilize or be based on Apache Hadoop, or some alternative, for example, including but not limited to Apache Spark, Cluster Map Reduce, High Performance Computing Cluster, or Hydra. Further details relating to how a set of contacts are determined for presentation in a contextual contact list are presented below in connection with the description of FIGS. 5 and 6.

Figure 5:
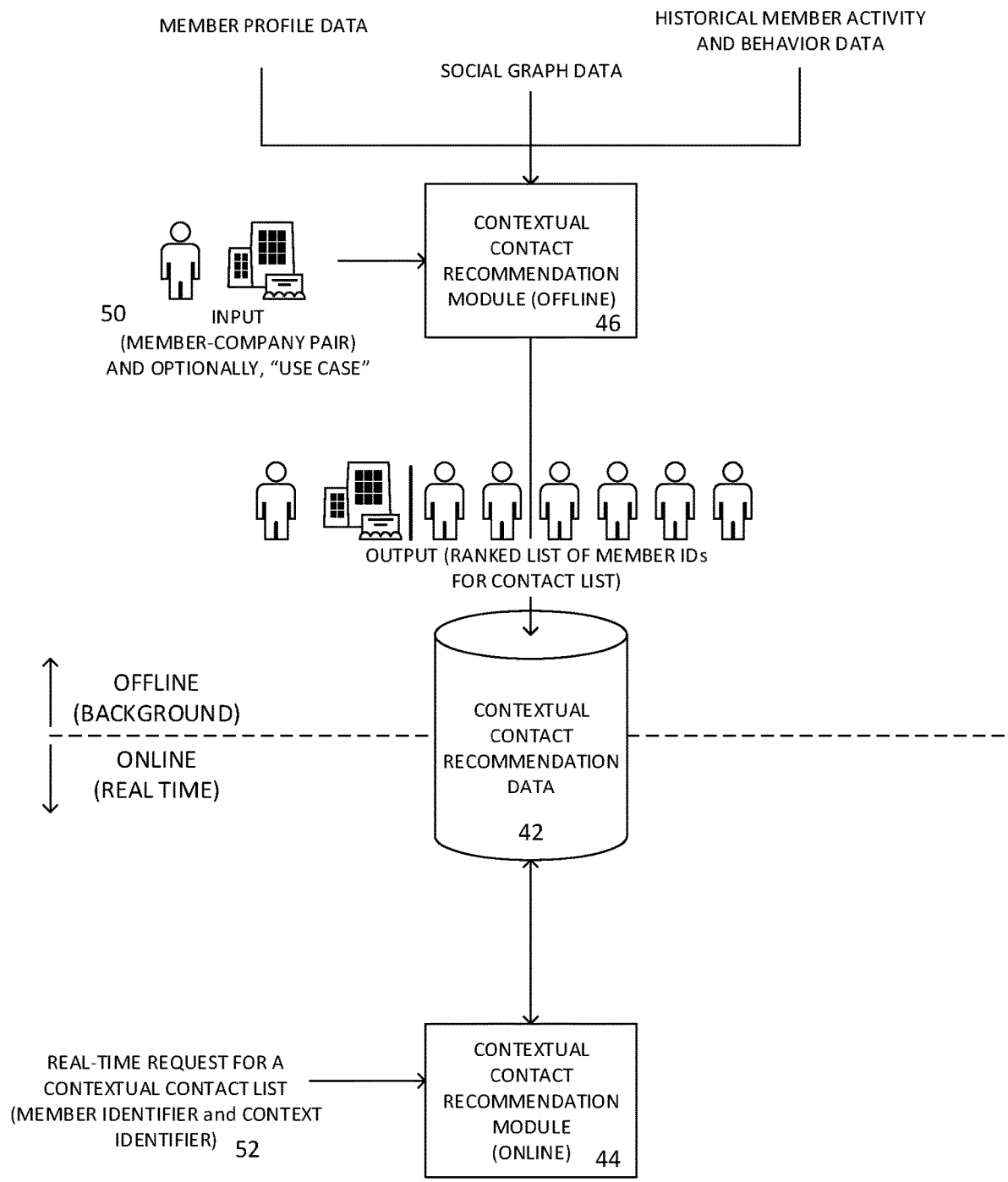
FIG. 5 is a block diagram illustrating the various inputs used by a contextual contact recommendation service to generate a ranked list of contacts, for presentation in a contextual contact list, consistent with some embodiments of the present invention.

FIG. 5 is a block diagram illustrating the various inputs used by a contextual contact recommendation service to pre-compute various sets of ranked contacts for different member and context combinations, for presentation in contextual contact lists, consistent with some embodiments of the present invention. In this example, for some set of members of a social networking service, for each of several particular contexts, a ranked list of recommended contacts is generated offline, and stored in a database (e.g., such as that with reference number 42 in FIG. 4). As the recommendations may change over time, with some embodiments, this offline batch computation may be configured to execute on a periodic basis (e.g., every few hours, daily, weekly, etc.).

As shown in FIG. 5, the (offline) contextual contact recommendation module 44 receives as input at least two parameters, a member identifier, and a context identifier. In this example, the two parameters are presented as a member-company pair 50 (e.g., a member identifier and a company identifier). Optionally, a "use case" may be provided as an input parameter. Based on this combination of input parameters, one of several scoring models is selected for scoring the candidate contacts. Next, the candidate contacts are selected or identified, generally, using the social graph data and the member profile data. With some embodiments, the candidate contacts may be limited to those other members who are first-degree, or, first- or second-degree connections of the member. Alternatively, other techniques may be used to select a set of candidate contacts. For instance, with some embodiments, candidate contacts may be selected based on identifying those members who meet some predefined threshold for some metric of connection strength or connection value.

As described in greater detail in connection with FIG. 6, a connection strength score may be based on the extent to which two members have similarities, based on their member profile attributes. For example, if two members work in the same industry, at the same company, attended the same school, are similar in age, and so forth, their connection strength score will be high. The connection value score may be based on the level of interaction, via the social networking service, between the two members. For example, the connection value score may be dependent upon how recently two members exchanged messages, and how frequently the two members exchange messages, generally.

Next, for each candidate contact, various attributes or features are retrieved for use in the selected scoring model, and a score for each candidate is then generated. For example, depending upon the attributes or features of the selected scoring model, the relevant corresponding member profile data, social graph data, and/or activity or behavior data is obtained for use by the scoring model. Finally, for the particular member-company pair (and, optionally, "use case"), the ranked list of member identifiers corresponding to the recommended contacts is written to a database for subsequent consumption by the real-time component of the recommendation service. This general process is simultaneously repeated for some large set of member and context pairs, and in some instances, use cases.

At some subsequent time, a real-time request 52 for a contextual contact list is received, where the request specifies at least a member identifier and a context identifier (and, optionally, a "use case"). Accordingly, the (online) contextual contact recommendation module 44 receives the request, reads from the database 42 the corresponding data record for the specified member identifier and context identifier, and communicates the ranked list of member identifiers back to the requesting process, so that the corresponding contacts (members) can populate the contextual contact list presented to the member.

With some embodiments, the (online) contextual recommendation module 44 may include a filtering or deduplication function, and/or basic business rules, so as to filter and/or manipulate the results in real-time. Additionally, with some embodiments, while not shown in FIG. 5, the (offline) contextual contact recommendation module 46 may generate additional output. For example, for each member in the ranked list of members, there may also be information generated that provides an explanation as to why the member is being included in the contextual contact list. For example, if the context is a company page, and a member is employed at the company, the explanation for including that member in a contextual contact list may be 1) the member's current employment at the particular company, 2) the member's previous employment at the company, or 3) the member's significant number of connections to other members who are, or were, employed at the company. By including this additional information, the member who is viewing the contextual contact list is provided with some additional context for understanding why a particular contact has been included in the contact list, and why the member may want to initiate a conversation with the particular contact.

Although many of the operations have been described in connection with FIG. 5 as occurring offline, consistent with alternative embodiments, some or all of the described operations may occur in real-time. Specifically, the operations may be performed subsequent and responsive to a member requesting a particular user interface. In yet other embodiments, some hybrid may be used, such that some operations occur offline, while others occur online or in real-time, responsive to an end-user's request for a web page or user interface. With some embodiments, for example, a candidate contact list may be computed offline for each member-context pair, while the actual scoring of the candidate contacts occurs in real-time, or, responsive to the end-user making a request for a web page or user interface.

Figure 6A:
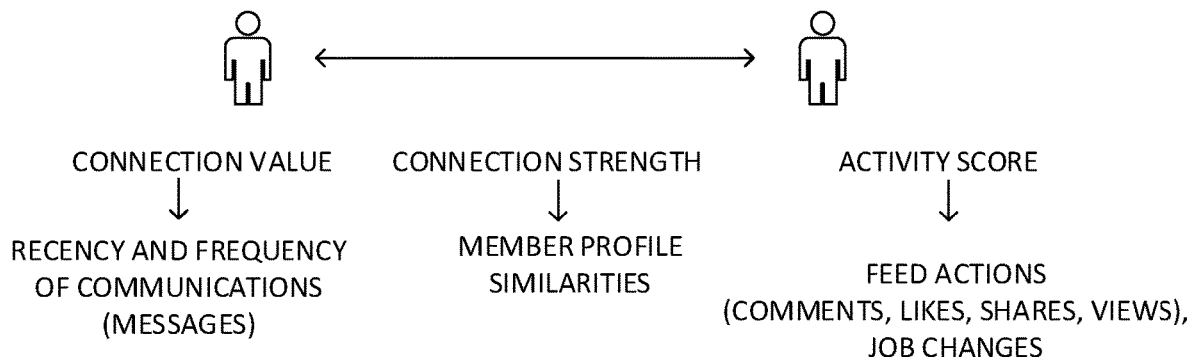
FIGS. 6A and 6B are diagrams illustrating examples of the algorithmic method operations that occur to score and rank various members for the purpose of populating a contact list, based on context and/or use case, consistent with some embodiments of the present invention.
Figure 6B:
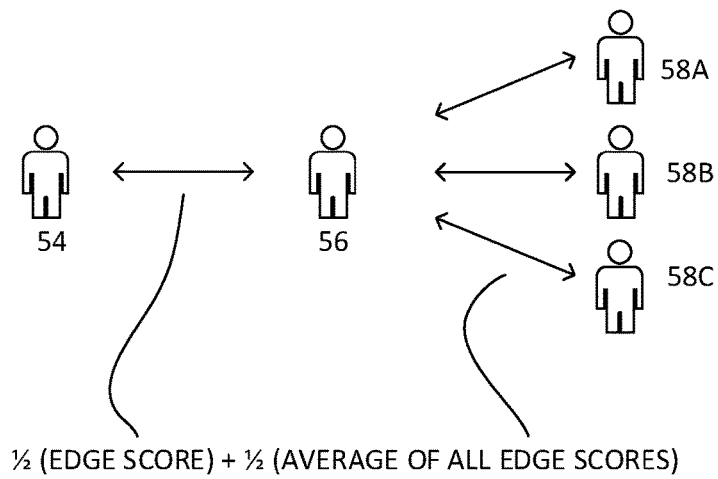

Turning now to FIGS. 6A and 6B, further details about the scoring models are provided. With some embodiments, the scoring models may differ depending upon the nature of the relationship between a member and the context. Specifically, and as illustrated in FIGS. 6A and 6B, when the context involves a company page or a job posting, scoring a candidate contact who is, or was, employed at the company is different (shown in FIG. 6A) than scoring a candidate contact who has one or more connections at the company (shown in FIG. 6B).

For example, in the context of a company profile page, or a job posting page, some of the recommended contacts may be first-degree connections of the viewing member, who are currently, or were previously, employed at the company associated with the company profile page, or the job posting. FIG. 6A illustrates how candidate contacts having this relationship with the context (e.g., the company) are scored. As shown in FIG. 6A, the various attributes or features included in the scoring calculation include a weighted combination of features that can generally be categorized into metrics for "connection value," "connection strength," and an "activity score". The connection value is based on the recency and frequency of communications (e.g., messages, emails, etc.) between two members. In contrast, the "connection strength" component of the score is based on similarities between members, as evidenced by information in the members' respective member profiles. Finally, a third category of features shown in FIG. 6A is referred to generally as an "Activity Score". This component score is comprised of features relating to how one member interacts with content posted by another member in a feed. For example, a member may comment, "like," share, or view another member's content postings. The intuition here is that the more activity one member directs at another, the stronger the relationship is between those two members. With some embodiments, for each candidate contact, some weighted combination of features is used to generate a score for each member pair, given a particular context (and, optionally, a "use case"). Accordingly, the weighting factors for certain features will be different, depending upon the context, and/or "use case".

Continuing with the same example, where the context is a company page or job posting, some candidate contacts may be selected for inclusion in the contextual contact list, not because of their employment status with the company, but because they have a considerable number of connections who are, or have been, employed at the particular company. FIG. 6B illustrates an example of how these particular candidate contacts might be scored, consistent with some embodiments of the present invention. In the example illustrated in FIG. 6B, the same set of features described and illustrated in FIG. 6A are used to individually score the edges connecting the viewing member 54 with the first-degree connection 56, and the first-degree connection 56 with each second-degree connection, 58A, 58B and 58C, that is, or was, employed at the subject company. The overall score for the candidate contact will be half (or some other fraction) of the score for the viewing member and the candidate contact (first-degree connection), plus half (or some other fraction) of the average score for each connection between the first-degree and second-degree connections, where the second-degree connections are those members who are, or were, employed with the subject company, associated with the context identifier.

With some embodiments, once the scores have been generated for each candidate contact, the candidate contacts may be ordered based on their scores, and written to a database for subsequent consumption by the online contextual contact recommendation module. With some embodiments, the candidate contacts may be ordered first, based on the reason they were selected as candidate contacts, and then based on their overall score. For example, candidate contacts who are currently employed may be given preference over candidate contacts who were previously employed with the subject company. Similarly, candidate contacts who are currently, or were previously, employed with the company may be given preference, when ordering the candidate contacts, over candidate contacts who were never employed at the company, but have one or more connections who are, or were previously, employed with the company.

With some embodiments, for each member and a given context, two different sets of ordered contacts may be generated for presentation in the same contact list. For instance, with some embodiments, the contact list may show a first set of contacts that have been selected and ordered based on a first scoring model, using a first set of attributes or features with a specific set of weighting factors, and the contact list may show a second set of contacts that have been selected and ordered based on a second scoring model, using a second set of attributes or features with a second set of weighting factors. For example, this may be beneficial where the contact list shows separate lists of contacts including a first list based on those members with whom the viewing member has recently had contact (e.g., exchanged messages), and a second list based on those members whom the viewing members has not recently had contact. Of course, other criteria may also be used to bifurcate the contact list into separate groups, where each group is determined with a different scoring model and different attributes or features.

Figure 7:
FIGS. 7, 8, 9, and 10 are user interface diagrams illustrating various user interfaces that include contextual contact lists, which have been populated with contacts for a particular member of a social networking service, based on a context and/or use case, consistent with various embodiments of the present invention.

FIG. 7 is a user interface diagram illustrating an example of a contextual contact list 60 that is presented in connection with a member profile page, where the member associated with the member profile is a second-degree connection (e.g., friend of a friend) of the member viewing the web page, consistent with some embodiments of the invention. When a member views a member profile page of another member—particularly, another member who is a second-degree connection—the contextual contact list 60 may be populated with first-degree connections of the viewing member who are also connected with the member whose member profile is being presented. As such, the viewing member might select a contact from the contact list who can make an introduction to the member whose member profile is being presented.

In the example user interface of FIG. 7, the member who is viewing the web page is not directly connected with the member, Aaron Weber, whose member profile page is presented. As illustrated in the messaging interface with reference number 60, the contact list includes contacts who are first-degree connections of the viewing member, and who are also connected to the member, Aaron Weber, whose member profile page is being presented. This provides the viewing member with the ability to quickly initiate a conversation with any one of the contacts listed in the contact list, and thereby request an introduction to the member, Aaron Weber. As illustrated in the contextual contact list 60, a reason or explanation for including several of the contacts is presented. For example, the contact, "Jeff Myer" currently "works with Aaron," whereas, the contact, "Susan Sherman" previously "worked with Aaron at Gizmo." With some embodiments, selecting a member from the contextual contact list may cause a separate messaging interface to be presented, where the separate messaging interface includes some predefined text that can be used to request an introduction to the member, Aaron Weber, whose member profile is presented. In general, this minimizes the amount of friction involved in requesting an introduction to a second-degree connection.

Figure 8:

FIG. 8 is a user interface diagram illustrating an example of a contextual contact list that is presented in connection with a feed or news feed, consistent with some embodiments of the invention. When a member is viewing a feed, the contact list may be automatically populated with contacts who have some association with the various content postings in the feed. As an example, in the contextual contact list 70 in FIG. 8, the top two contacts in the contextual contact list are contacts that connect the viewing member with the company, Avocado, which is a company referenced in the content posting with reference number 72. Similarly, three of the contacts in the contextual contact list are presented because, according to their member profiles, they have the skill, "Java Programming," which is a subject matter referenced in the content posting with reference number 74.

Figure 9:

FIG. 9 is a user interface diagram illustrating an example of how a contextual contact list might be implemented and presented on a mobile computing device, consistent with some embodiments of the present invention. As illustrated in FIG. 9, the contextual contact list is presented as the sole messaging interface, as opposed to being presented on top of another interface or web page. With some embodiments, the context from which the contacts in the contact list are determined may be a web page or interface viewed by the end-user prior to the end-user accessing the contextual contact list. Accordingly, the contextual contact list may be based on a context that is derived or associated with a previously viewed web page or interface. As an example, if a member of the social networking service is viewing a job posting, and then interacts with the mobile application to invoke the messaging interface, the contact list presented to the member may be personalized to show other members who have a relationship to the company on whose behalf the job posting was presented. With some embodiments, the context on which the contact list is based may not be an individual web page or interface, but information obtained via the end-user's historical interactions with various applications and services of the social networking service. Accordingly, even when the contextual contact list is presented on a mobile computing device, without a corresponding web page or interface, the contextual contact recommendation service may personalize the contact list by ordering the contacts based on a member's previous actions and behavior.

Figure 10:
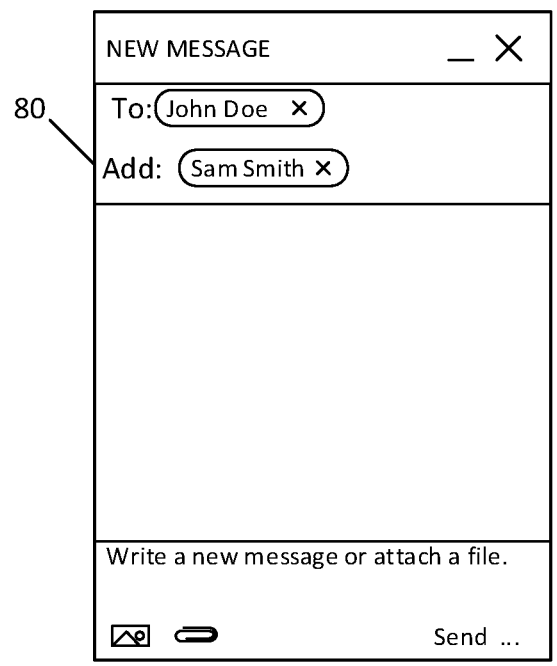

FIG. 10 is a user interface diagram illustrating an example of how the contextual contact recommendation service may provide one or more recommendations during message composition, consistent with some embodiments. As illustrated in FIG. 10, the messaging interface includes a message recipient box 80, where a message has been addressed to a first recipient, "John Doe." With some embodiments of the present invention, the contextual contact recommendation service may utilize one or more existing message recipients as part of the context to determine and recommend one or more other contacts to whom a message could or should be addressed. As an example, the recommendation may be based on some combination of the various features described in connection with FIGS. 5 and 6 and the existing message recipient—in this example, "John Doe."

Figure 11:
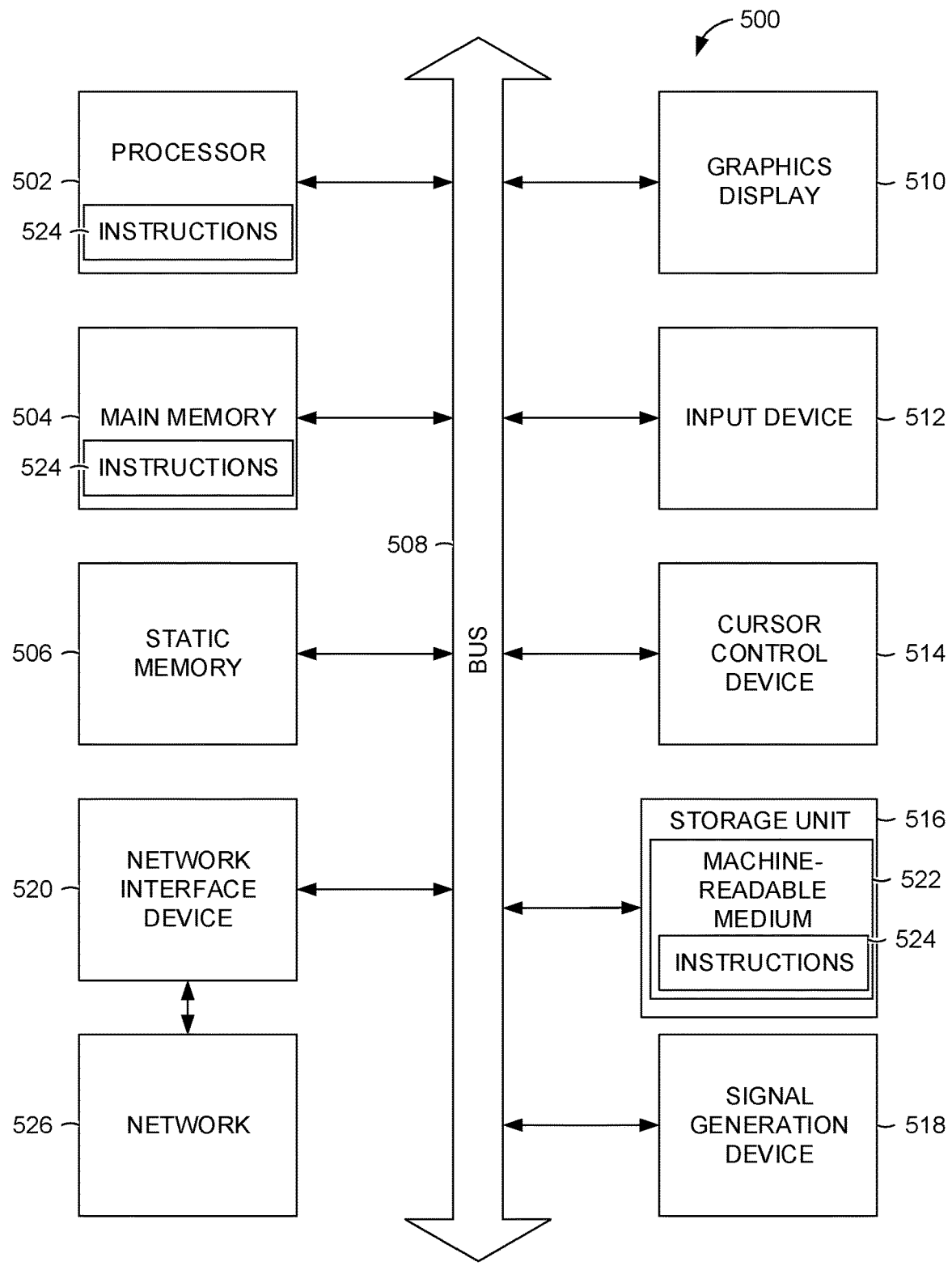
FIG. 11 is a system diagram illustrating an example of a computing device with which, embodiments of the present invention might be implemented.

FIG. 11 is a block diagram illustrating an example of a machine upon which one or more example embodiments may be implemented. In alternative embodiments, the machine (500) may operate as a standalone device or may be connected (e.g., networked) to other machines. In a networked deployment, the machine (500) may operate in the capacity of a server machine, a client machine, or both in server-client network environments. In an example, the machine (500) may act as a peer machine in peer-to-peer (P2P) (or other distributed) network environment. The machine (500) may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine (500) is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) (500) may include a hardware processor (502) (e.g., a central processing unit (CPU), a graphics processing unit (GPU), a hardware processor core, or any combination thereof), a main memory (504) and a static memory (506), some or all of which may communicate with each other via an interlink (e.g., bus) (508). The machine (500) may further include a display device (510), an alphanumeric input device (512) (e.g., a keyboard), and a user interface (UI) navigation device (514) (e.g., a mouse). In an example, the display device (510), input device (512) and UI navigation device (514) may be a touch screen display. The machine (500) may additionally include a mass storage device (e.g., drive unit) (516), a signal generation device (518) (e.g., a speaker), a network interface device (520), and one or more sensors (521), such as a global positioning system (GPS) sensor, compass, accelerometer, or other sensor. The machine (500) may include an output controller (528), such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device (516) may include a machine-readable medium (522) on which is stored one or more sets of data structures or instructions (524) (e.g., software) embodying or utilized by any one or more of the techniques or functions described herein. The instructions (524) may also reside, completely or at least partially, within the main memory (504), within static memory (506), or within the hardware processor (502) during execution thereof by the machine (500). In an example, one or any combination of the hardware processor (502), the main memory (504), the static memory (506), or the storage device (516) may constitute machine-readable media.

While the machine-readable medium (522) is illustrated as a single medium, the term "machine-readable medium" may include a single medium or multiple media (e.g., a centralized or distributed database, and/or associated caches and servers) configured to store the one or more instructions (524).

The term "machine-readable medium" may include any medium that is capable of storing, encoding, or carrying instructions (524) for execution by the machine (500) and that cause the machine (500) to perform any one or more of the techniques of the present disclosure, or that is capable of storing, encoding or carrying data structures used by or associated with such instructions (524). Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions (524) may further be transmitted or received over a communications network (526) using a transmission medium via the network interface device (520) utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device (520) may include one or more physical jacks (e.g., Ethernet, coaxial, or phone jacks) or one or more antennas to connect to the communications network (526). In an example, the network interface device (520) may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions (524) for execution by the machine (500), and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and unless otherwise stated, nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method executed by one or more servers hosting a social networking service, the method comprising:

receiving, from a client computing device, a request for a web page hosted by the social networking service, the request associated with a member identifier of a member of the social networking service, the requested web page associated with a URL that includes a context identifier;

responsive to receiving the request for the web page hosted by the social networking service:

selecting by the one or more servers, from a set of scoring models, a scoring model corresponding with the context identifier included with the URL of the requested web page, wherein each scoring model in the set of scoring models comprises a weighted combination of features with weighting factors that are dependent upon the context identifier and differ between scoring models, wherein the features in the weighted combination of features comprise a first feature relating to the recency and/or frequency of communications between the member and a candidate contact, a second feature relating to a measure of similarity between attributes of member profiles of the member and a candidate contact, and a third feature relating to a measure of activity directed by the candidate contact to content posted by the member;

selecting by the one or more servers a set of candidate contacts, who are members of the social networking service, for possible inclusion in a contextual contact list to be presented with the requested web page, the candidate contacts selected based on first selection criteria associated with the context identifier included in the URL of the requested web page;

for each candidate contact in the set of candidate contacts, generating a score using the selected scoring model;

communicating the web page to the client computing device for presentation at the client computing device; and causing a subset of the set of candidate contacts to be presented in a contextual contact list at the client computing device with the web page, the subset of the candidate contacts presented in the contextual contact list in order of their respective score generated with the selected scoring model;

wherein the contextual contact list is presented at the client computing device in an overlay-interface, overlaying the web page, the overlay-interface including control elements that enable the overlay-interface to be minimized and/or maximized, and each candidate contact in the contextual contact list being user-selectable to invoke a messaging interface via which a message can be composed and communicated to the selected candidate contact via an instant messaging service.

2. The computer-implemented method of claim 1, wherein the context identifier is a company identifier that corresponds with a company having a company profile hosted by the social networking service, and the set of candidate contacts selected are those members of the social networking service who are i) directly connected via the social networking service to the member, and are currently, or were previously, employed with the company, or, ii) directly connected via the social networking service to the member, and have one or more connections to other members of the social networking service who are currently, or were previously, employed with the company.

3. The computer-implemented method of claim 1, wherein the context identifier is an identifier that corresponds with a job posting on behalf of a company, and the set of candidate contacts selected are those members of the social networking service who are i) connected via the social networking service to the member, and are currently, or were previously, employed with a company on whose behalf the job posting has been posted, or, ii) connected via the social networking service to the member, and have one or more connections to other members of the social networking service who are currently, or were previously, employed with a company on whose behalf the job posting has been posted.

4. The computer-implemented method of claim 1, wherein selecting the set of candidate contacts based on the first selection criteria associated with the context identifier included in the URL of the requested web page includes selecting those members of the social networking service who are first-degree connections of the member, having directly connected with the member via the social networking service.

5. The computer-implemented method of claim 1, wherein selecting the set of candidate contacts based on the first selection criteria associated with the context identifier included in the URL of the requested web page includes selecting those members of the social networking service who are second-degree connections of the member, having connected with at least one other member of the social networking service who is a first-degree connection of the member.

6. The computer-implemented method of claim 1, wherein the score generated with the scoring model is derived as a weighted combination of features including some features derived from information included in the member profiles of the member and the member profiles of the candidate contacts.

7. The computer-implemented method of claim 1, wherein the score generated with the scoring model is derived as a weighted combination of features including some features derived from information indicating the recency and frequency of communications, via the social networking service, between the member and other members who are candidate contacts.

8. The computer-implemented method of claim 1, wherein the score generated with the scoring model is derived as a weighted combination of features including some features derived from information indicating that a candidate contact has interacted, via the social networking service, with content posted to the social networking service by the member, and/or information indicating that the member has interacted, via the social networking service, with content posted by a candidate contact.

9. The computer-implemented method of claim 1, wherein selecting the set of candidate contacts based on the first selection criteria associated with the context identifier included in the URL of the requested web page includes selecting only candidate contacts who have established a direct connection, via the social networking service, with the member.

10. The computer-implemented method of claim 1, wherein selecting the set of candidate contacts based on the first selection criteria associated with the context identifier included in the URL of the requested web page includes selecting only candidate contacts who have established a direct connection, via the social networking service, with the member, or candidate contacts who are directly connected to another member with whom the member is directly connected, via the social networking service.

11. The computer-implemented method of claim 1, wherein the subset of the set of candidate contacts presented in the contextual contact list at the client computing device are presented with a second set of candidate contacts, the second set of candidate contacts selected with second selection criteria associated with the context identifier included in the URL of the requested web page and presented in order of respective scores derived for each candidate contact in the second set of candidate contacts using a second scoring model selected from the set of scoring models based on the context identifier included in the URL of the requested web page.

12. The computer-implemented method of claim 1, further comprising:
causing information associated with at least one candidate contact in the subset of candidate contacts to be presented in the contextual contact list, wherein the information presented in the contextual contact list provides an explanation as to why the at least one candidate contact has been selected for presentation in the contextual contact list.

13. A system comprising:
at least one processor for executing computer-readable instructions;
a memory storage device storing instructions, which, when executed by the at least one processor, cause the system to perform operations comprising:
receiving, from a client computing device, a request for a web page hosted by a social networking service, the request associated with a member identifier of a member of the social networking service, the web page associated with a URL that includes a context identifier;
responsive to receiving the request for the web page hosted by the social networking service:
selecting, from a set of scoring models, a scoring model corresponding with the context identifier included in the URL of the requested web page, wherein each scoring model in the set of scoring models comprises a weighted combination of features with weighting factors that are dependent upon the context identifier and differ between scoring models, wherein the features in the weighted combination of features comprise a first feature relating to the recency and/or frequency of communications between the member and a candidate contact, a second feature relating to a measure of similarity between attributes of member profiles of the member and a candidate contact, and a third feature relating to a measure of activity directed by the candidate contact to content posted by the member;
selecting a set of candidate contacts, who are members of the social networking service, for possible inclusion in a contextual contact list to be presented with the requested web page, the candidate contacts selected based on first selection criteria associated with the context identifier included in the URL of the requested web page;
for each candidate contact in the set of candidate contacts, generating a score using the selected scoring model;
communicating the web page to the client computing device for presentation at the client computing device; and
causing a subset of the set of candidate contacts to be presented in a contextual contact list at the client computing device with the web page, the subset of the candidate contacts presented in the contextual contact list in order of their respective score generated with the selected scoring model, wherein the contextual contact list is presented at the client computing device in an overlay-interface, overlaying the web page, the overlay-interface including control elements that enable the overlay-interface to be minimized and/or maximized, and each candidate contact in the contextual contact list being user-selectable to invoke a messaging interface via which a message can be composed and communicated to the selected candidate contact via an instant messaging service.

14. The system of claim 13, wherein the context identifier is a company identifier that corresponds with a company having a company profile hosted by the social networking service, and the set of candidate contacts selected based on the first selection criteria are those members of the social networking service who are i) connected via the social networking service to the member, and are currently, or were previously, employed with the company, or, ii) connected via the social networking service to the member, and have one or more connections to other members of the social networking service who are currently, or were previously, employed with the company.

15. The system of claim 13, wherein the context identifier is an identifier that corresponds with a job posting on behalf of a company, and the set of candidate contacts selected based on the first selection criteria are those members of the social networking service who are i) connected via the social networking service to the member, and are currently, or were previously, employed with a company on whose behalf the job posting has been posted, or, ii) connected via the social networking service to the member, and have one or more connections to other members of the social networking service who are currently, or were previously, employed with a company on whose behalf the job posting has been posted.

16. The system of claim 13, wherein selecting the set of candidate contacts based on the first selection criteria includes selecting those members of the social networking service who are first-degree connections of the member, having directly connected with the member via the social networking service.

17. The system of claim 13, wherein selecting the set of candidate contacts based on the first selection criteria includes selecting those members of the social networking service who are second-degree connections of the member, having connected with at least one other member of the social networking service who is a first-degree connection of the member.

18. The system of claim 13, wherein the subset of the set of candidate contacts presented in the contextual contact list at the client computing device are presented with a second set of candidate contacts, the second set of candidate contacts selected with second selection criteria associated with the context identifier included in the URL of the requested web page and presented in order of respective scores derived for each candidate contact in the second set of candidate contacts using a second scoring model selected from the set of scoring models based on the context identifier included in the URL of the requested web page.

19. The system of claim 13, wherein the instructions cause the system to perform additional operations comprising:
  causing information associated with at least one candidate contact in the subset of candidate contacts to be presented in the contextual contact list, wherein the information presented in the contextual contact list provides an explanation as to why the at least one candidate contact has been selected for presentation in the contextual contact list.

20. A system comprising:
  means for receiving, from a client computing device, a request for a content item hosted by a social networking service, the request associated with a member identifier of a member of the social networking service, the content item associated with a content identifier that includes a context identifier;
  responsive to receiving the request for the content item hosted by the social networking service:
  means for selecting, from a set of scoring models, a scoring model corresponding with the context identifier included in the content identifier of the requested content item, wherein each scoring model in the set of scoring models comprises a weighted combination of features with weighting factors that are dependent upon the context identifier and differ between scoring models, wherein the features in the weighted combination of features comprise a first feature relating to the recency and/or frequency of communications between the member and a candidate contact, a second feature relating to a measure of similarity between attributes of member profiles of the member and a candidate contact, and a third feature relating to a measure of activity directed by the candidate contact to content posted by the member;
  means for selecting a set of candidate contacts for possible inclusion in a contextual contact list to be presented with the requested content item, the candidate contacts selected based on selection criteria associated with the context identifier included in the content identifier of the requested content item;
  means for generating a score, using the selected scoring model, for each candidate contact in the set of candidate contacts;
  means for communicating the content item to the client computing device for presentation at the client computing device; and
  means for causing a subset of the set of candidate contacts to be presented in a contextual contact list at the client computing device with the content item, the subset of the candidate contacts presented in the contextual contact list in order of their respective score generated with the selected scoring model;
  means for causing information associated with at least one candidate contact in the subset of candidate contacts to be presented in the contextual contact list, wherein the information presented in the contextual contact list provides an explanation as to why the at least one candidate contact has been selected for presentation in the contextual contact list;
  wherein the contextual contact list is presented at the client computing device in an overlay-interface, the overlay-interface including control elements that enable the overlay-interface to be minimized and/or maximized, and each candidate contact in the contextual contact list being user-selectable to invoke a messaging interface via which a message can be composed and communicated to the selected candidate contact via an instant messaging service.

* * * * *